US012217015B2

(12) United States Patent
Liu et al.

(10) Patent No.: US 12,217,015 B2
(45) Date of Patent: Feb. 4, 2025

(54) TRANSLATOR PEN INCLUDING HOUSING AND PEN HEAD AND TRANSLATION METHOD USING SAME

(71) Applicant: BOE TECHNOLOGY GROUP CO., LTD., Beijing (CN)

(72) Inventors: Cheng Liu, Beijing (CN); Xinyan Shi, Beijing (CN); Guanchu Guo, Beijing (CN); Sijia Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 417 days.

(21) Appl. No.: 17/639,111

(22) PCT Filed: Mar. 22, 2021

(86) PCT No.: PCT/CN2021/081973
§ 371 (c)(1),
(2) Date: Feb. 28, 2022

(87) PCT Pub. No.: WO2021/190427
PCT Pub. Date: Sep. 30, 2021

(65) Prior Publication Data
US 2022/0335228 A1 Oct. 20, 2022

(30) Foreign Application Priority Data
Mar. 27, 2020 (CN) .......................... 202020428229.6

(51) Int. Cl.
G06F 40/47 (2020.01)
B43K 29/08 (2006.01)
(Continued)

(52) U.S. Cl.
CPC .............. *G06F 40/58* (2020.01); *B43K 29/08* (2013.01); *G06F 40/47* (2020.01); *G06V 10/12* (2022.01); *G06V 10/17* (2022.01); *G06V 30/142* (2022.01)

(58) Field of Classification Search
None
See application file for complete search history.

(56) References Cited

U.S. PATENT DOCUMENTS

| | | | | |
|---|---|---|---|---|
| 6,491,225 | B1 * | 12/2002 | Dvorkis | G06K 7/10584 235/472.01 |
| 2008/0264701 | A1 * | 10/2008 | Radtke | G06F 3/03545 715/764 |
| 2019/0182402 | A1 * | 6/2019 | Shriesher | H04N 1/1075 |

FOREIGN PATENT DOCUMENTS

| | | | |
|---|---|---|---|
| CN | 202472687 U | * | 10/2012 |
| CN | 102982326 A | | 3/2013 |

(Continued)

OTHER PUBLICATIONS

China Patent Office, CN202020428229.6 First Office Action issued on Jul. 14, 2020.

*Primary Examiner* — Andrew H Lam
(74) *Attorney, Agent, or Firm* — HOUTTEMAN LAW LLC

(57) ABSTRACT

A translator pen and a translation method using same are provided. The translator pen includes a housing and a pen head. The housing forms a first accommodation cavity adapted to accommodate an image collector. An outer contour of the pen head is formed into a tapered shape, an outer diameter of the pen head gradually decreases along a direction of the pen head away from the housing and forms a second accommodation cavity adapted to accommodate a pen core. At least a portion of the end of the housing, which does not form the pen head, forms an inclined surface. The (Continued)

inclined surface is inclined relative to the outer contour of the pen head toward an outside of the housing along a direction of the housing away from the pen head. The image collector is configured to face the inclined surface.

11 Claims, 5 Drawing Sheets

(51) Int. Cl.
   *G06F 40/58*    (2020.01)
   *G06V 10/10*    (2022.01)
   *G06V 10/12*    (2022.01)
   *G06V 30/142*   (2022.01)

(56) References Cited

FOREIGN PATENT DOCUMENTS

| CN | 205210885 U | 5/2016 |
| CN | 209037248 U | 6/2019 |
| CN | 109960431 A | 7/2019 |
| CN | 209525666 U | 10/2019 |
| CN | 211827291 U | 10/2020 |

\* cited by examiner

TRANSLATOR PEN INCLUDING HOUSING AND PEN HEAD AND TRANSLATION METHOD USING SAME

CROSS REFERENCE TO RELATED APPLICATIONS

The present application claims priority of the Chinese patent application No. 202020428229.6 filed to the China National Intellectual Property Administration (CNIPA) on Mar. 27, 2020, the content of which is incorporated herein by reference.

TECHNICAL FIELD

The disclosure relates to the technical field of electronic products, in particular, to a translator pen and a translation method using the same.

BACKGROUND

Translator pen is a typical pen-type word search and translation device. The existing translator pen generally acquires a text image by scanning.

However, the scanning type translator pen has use limitations since the camera is usually disposed at the pen head. During use of the translator pen, the pen head needs to be dragged along the paper surface, thus the pen is suitable for translating a paragraph. In the case where the dictionary meaning of a single word needs to be looked up, dragging has its disadvantages of unnatural use due to being not like an ordinary pen and the trouble of selecting a target word among a plurality of words scanned at one time. Meanwhile, the viewfinder of the scanning type translator pen generally has a fixed and limited width, thus it is impossible to input all words if the font size is comparatively large, or too many lines of words are input at one time if the font size is too small, which would result in one more time selection of a word to be translated.

SUMMARY

In order to solve at least one of the above problems, a first aspect of the present disclosure provides a translator pen, including a housing and a pen head at an end of the housing, wherein the housing forms a first accommodation cavity adapted to accommodate an image collector; an outer contour of the pen head is formed into a tapered shape, an outer diameter of the pen head gradually decreases along a direction of the pen head away from the housing and forms a second accommodation cavity adapted to accommodate a pen core; the pen head is formed at a portion of the end of the housing, and at least a portion of the end of the housing, which does not form the pen head, forms an inclined surface, the inclined surface being inclined relative to the outer contour of the pen head toward an outside of the housing along a direction of the housing away from the pen head, and the image collector is disposed on the inclined surface.

Further, the inclined surface is formed at an entire end of the housing, and the inclined surface is of an oval shape.

Further, the first accommodation cavity further includes a trigger switch and a controller, the pen core includes a pen tip away from one end of the housing, the pen tip is configured to indicate a word to be translated and transmit a received external force to the trigger switch to trigger the image collector to collect an image to be translated including the pen tip and the word to be translated indicated by the pen tip, so that the controller translates the word to be translated according to the image to be translated and outputs a translation result.

Further, a window is disposed on the inclined surface, the window corresponds to a viewfinder of the image collector disposed in the housing, and the image collector collects, by the viewfinder, the image to be translated including the pen tip and the word to be translated indicated by the pen tip through the window.

Further, the translator pen includes a cylindrical linkage structure connecting the pen core and the trigger switch, and the linkage structure transmits the external force received by the pen tip indicating the word to be translated to the trigger switch.

Further, the housing includes a first housing and a second housing formed by snap-fit, and the first housing and the pen head are formed into an integral structure.

Further, the image collector includes a camera, an optical axis of the camera is parallel to an axial direction of a long axis of the pen core; or the optical axis of the camera and the axial direction of the long axis of the pen core form an angle smaller than a preset degree.

Further, an end of the first accommodation cavity far from the pen head further includes an antenna adapted to communicate with an external device, and the antenna is at an inner side of the housing.

Further, the antenna is a flexible circuit board structure electrically connected to the controller through a pin.

Further, an end of the first accommodation cavity far from the pen head further includes an antenna adapted to communicate with an external device, and the antenna is attached to an inner wall of the housing.

A second aspect of the present disclosure provides a translation method using a translator pen, wherein the translator pen includes a housing and a pen head at an end of the housing, wherein the housing forms a first accommodation cavity adapted to accommodate an image collector; an outer contour of the pen head is formed into a tapered shape, an outer diameter of the pen head gradually decreases along a direction of the pen head away from the housing and forms a second accommodation cavity adapted to accommodate a pen core; the pen head is formed at a portion of the end of the housing, and at least a portion of the end of the housing, which does not form the pen head, forms an inclined surface, the inclined surface being inclined relative to the outer contour of the pen head toward an outside of the housing along a direction of the housing away from the pen head, the image collector is disposed on the inclined surface, the first accommodation cavity further includes a trigger switch and a controller, and the pen core includes a pen tip far from one end of the housing, wherein the method includes:

a pen tip pressing step of pressing the pen tip close to a word to be translated, and transmitting a received external force to the trigger switch, which sends a trigger signal;

a photographing step of controlling, by the controller, the image collector to collect an image to be translated including the pen tip and the word to be translated indicated by the pen tip in response to the trigger signal;

an image preprocessing step of preprocessing a collected image to be translated to obtain a processed image;

a text detection step of marking an image area with words on the processed image to select a target image area where the word to be translated is located;

a character recognition step of performing character recognition on the target image area to obtain a word character to be translated;

a translation step of translating the word character to obtain a translation result; and a result output step of outputting the translation result.

Further, the image preprocessing at least includes one or a plurality of the following steps: resolution adjustment, image cropping, image rotation, and image distortion correction.

BRIEF DESCRIPTION OF DRAWINGS

The specific embodiments of the present disclosure will now be further described in detail with reference to the accompanying drawings.

DETAIL DESCRIPTION OF EMBODIMENTS

Figure 1:
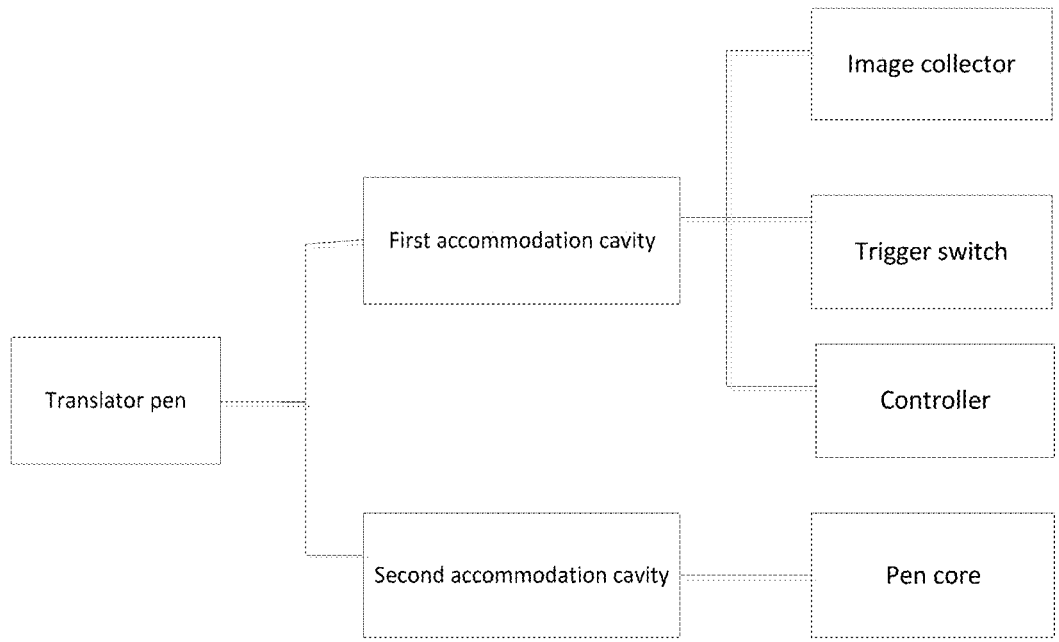
FIG. 1 is a block diagram illustrating a translator pen according to an embodiment of the present disclosure.

To illustrate the disclosure more clearly, the disclosure is further described below in conjunction with alternative embodiments and the accompanying drawings. Similar components in the figures are denoted by the same reference numerals. It is to be understood by persons skilled in the art that the following detailed description is illustrative and not restrictive, and is not to be taken as limiting the scope of the present disclosure.

As shown in FIG. 1, an embodiment of the present disclosure provides a translator pen including a housing and a pen head at an end of the housing. The housing forms a first accommodation cavity adapted to accommodate an image collector. An outer contour of the pen head is formed into a tapered shape, and an outer diameter of the pen head gradually decreases along a direction of the pen head away from the housing and forms a second accommodation cavity adapted to accommodate a pen core. The pen head is formed at a portion of the end of the housing, and at least a portion of the end of the housing, which does not form the pen head, forms an inclined surface, the inclined surface being inclined relative to the outer contour of the pen head toward an outside of the housing along a direction of the housing away from the pen head, and the image collector is disposed on the inclined surface.

Figure 2A:
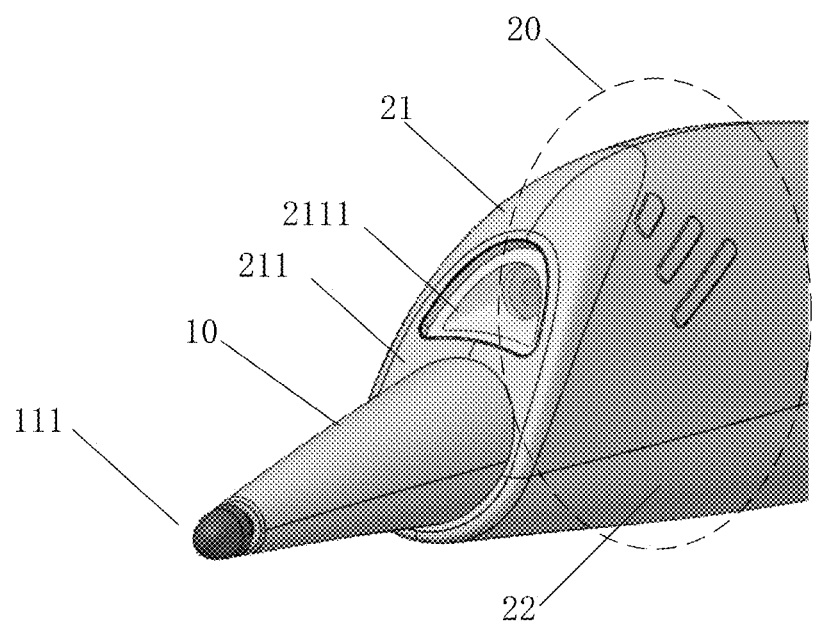
FIG. 2a is a partial perspective view of the translator pen according to an embodiment of the present disclosure.
Figure 2B:
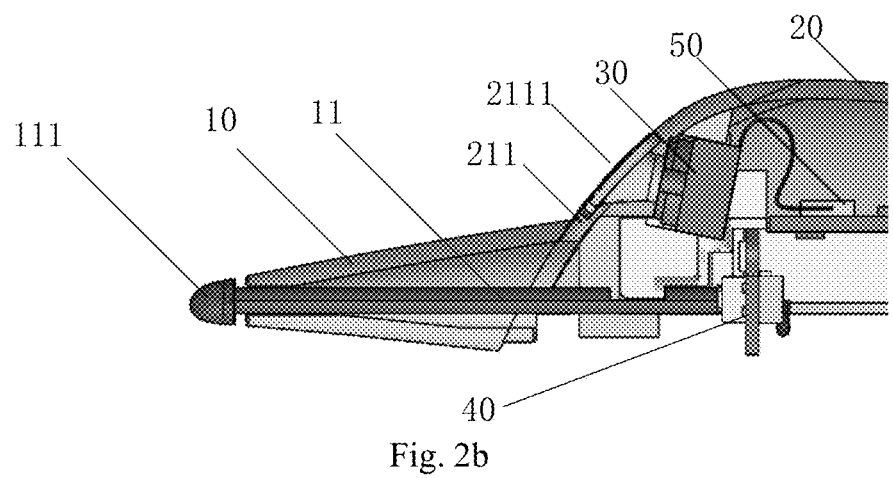
FIG. 2b is a partial side sectional view of the translator pen according to an embodiment of the present disclosure.
Figure 2C:
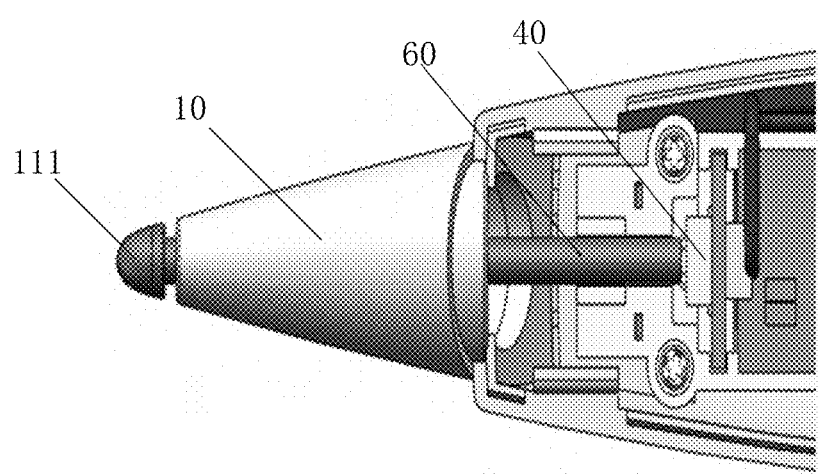
FIG. 2c is another partial side sectional view of the translator pen according to an embodiment of the present disclosure.

As shown in FIGS. 2a-2c, optionally, the housing includes a first housing 21 and a second housing 22 formed by snap-fit, one end of the first housing 21 close to the pen head 10 includes an inclined surface 211 expanding outward along the first housing 21 in a direction away from the pen head 10, the inclined surface 211 is of an oval shape, and an image collector 30 is disposed on the inclined surface 211. Optionally, the inclined surface 211 is formed at an entire end of the housing, the pen head 10 is cone-like, and the pen head 10 is formed at one side of the end of the housing.

In the embodiment, by collecting an image to be translated of a word to be translated indicated by the pen head with an image collector disposed on the inclined surface, the problem of erroneous word fetching of the existing stylus pen can be solved, and the word fetching speed and word fetching efficiency can be effectively improved.

In one specific example, the first accommodation cavity further includes a trigger switch and a controller, the pen core includes a pen tip far from one end of the housing, and the pen tip is adapted to indicate a word to be translated and transmit a received external force to the trigger switch to trigger the image collector to collect an image to be translated including the pen tip and the word to be translated indicated by the pen tip, so that the controller translates the word to be translated according to the image to be translated and outputs a translation result.

As shown in FIGS. 2a-2c, the translator pen includes a pen head 10, and a housing 20 formed by snap-fitting a first housing 21 and a second housing 22.

The pen head 10 is cone-like, an outer diameter of the pen head gradually decreases along a direction of the pen head away from the housing. Specifically, a cross section of the pen head is an inverted triangle with the pen tip side being smaller. A second accommodation cavity formed by the pen head accommodates a pen core 11, the pen core 11 includes a pen tip 111 far from one end of the housing, the pen tip 111 is adapted to indicate a word to be translated, and the pen core 11 is electrically connected to a trigger switch 40 and transmits a received external force to the trigger switch 40. It should be noted that the pen core may be a pen core having a writing function, such as a ball-point pen refill or a felt-tip pen refill; the pen core may also be a structural element without writing function such as a pen-shaped structural element made of plastic material.

The housing 20 forms a first accommodation cavity adapted to accommodate the image collector 30, the trigger switch 40 and the controller 50.

Figure 3A:
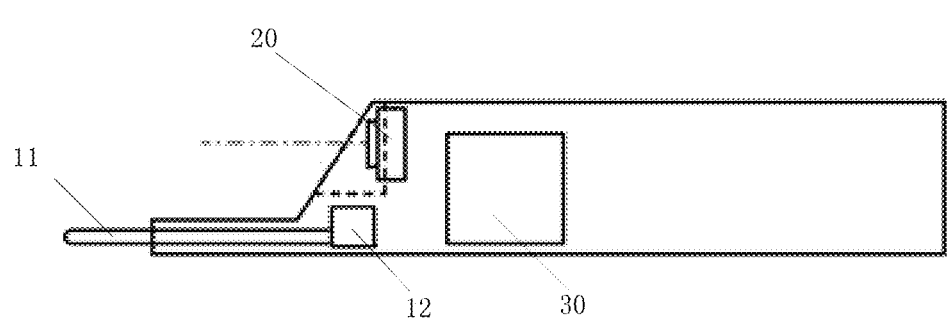
FIG. 3a is a schematic structural diagram of the translator pen according to an embodiment of the present disclosure.
Figure 3B:
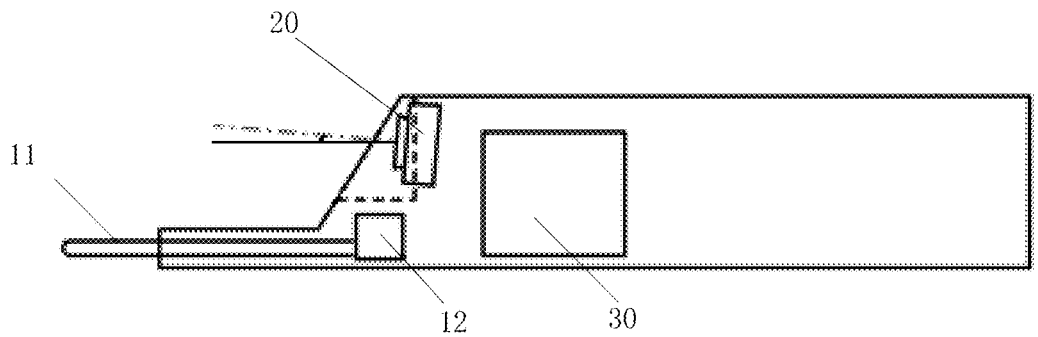
FIG. 3b is another schematic structural diagram of the translator pen according to an embodiment of the present disclosure.

The image collector 30 is located at one side of the first accommodation cavity, and is electrically connected to the controller. The field of view of the image collector covers the pen tip, and the image collector is configured to collect an image to be translated including the pen tip and the word to be translated indicated by the pen tip, and to transmit the image to be translated to the controller. In this embodiment, the image collector is a camera having a wide viewing angle with a field of view covering the pen tip. For example, as shown in FIG. 3a, an optical axis of the camera is parallel to an axial direction of a long axis of the pen core; as shown in FIG. 3b, the optical axis of the camera and the axial direction of the long axis of the pen core form an angle smaller than a preset degree, so that the field of view of the camera is ensured to cover the pen tip. The image to be translated collected by the camera includes the pen tip and the word to be translated indicated by the pen tip. For example, according to different writing and printing habits, the pen tip may click in different directions of the word to be translated. Specifically, the pen tip may click a position below a horizontal line or a position in a right lower side of the horizontal line, or a position in a right side/right lower side/left side/left lower side of a vertical line, or a position below the vertical line.

In the embodiment, the translator pen can effectively fetch a word to be translated according to an instruction of the pen tip by using the image to be translated including the pen tip and the word indicated by the pen tip. Meanwhile, in order to ensure the resolution of the image to be translated collected by the camera, the image collector may further include a supplement light or other auxiliary cameras to collect a clearer image to be translated.

The trigger switch 40 may be a pressure sensor or a micro switch. As the pen tip 111 fetches a word, the pen tip clicks a word to be translated and receives an external force from a book or a display device displaying the word to be translated, or an external force from a user during word fetching, the pen tip 111 transmits the external force to the trigger switch 40, and the trigger switch 40 generates a trigger signal according to the external force and transmits the trigger signal to the controller 50.

The controller 50 controls the image collector to collect an image to be translated in response to the trigger signal, and recognizes and translates the word to be translated according to the image to be translated, and outputs a translation result. In the embodiment, the controller may be a single chip, a CPU, an SoC, or a control chip with similar functions. Similar to the existing technology, the controller is provided with a control instruction, and the controller generates an instruction according to a received signal and sends the instruction to a corresponding functional device. For example, the controller generates a collection instruction according to a received trigger signal, and controls the image collector to collect an image to be translated, then performs image recognition according to the collected image to be translated to recognize the word to be translated, and translates the word to be translated and outputs a translation result.

The translator pen of the embodiment ensures that the image to be translated collected by the image collector includes the pen tip and the word to be translated indicated by the pen tip through structures of various functional devices that are specifically provided, and can effectively identify the word required to be translated, thereby solving the problems of excessive words fetching, erroneous word fetching and incomplete words fetching of the existing scanning type translator pen, and effectively improving the word fetching speed and the word fetching efficiency.

In view of protection of the image collector, in an optional embodiment, as shown in FIGS. 2a-2c, a window 2111 is further disposed on the inclined surface 211. The window 2111 corresponds to a viewfinder of the image collector 30 disposed in the first accommodation cavity, and the image collector 30 acquires, by the viewfinder, an image to be translated including the pen tip 111 and the word to be translated indicated by the pen tip through the window 2111.

In the embodiment, a transparent window 2111 is disposed on the inclined surface, the image collector 30 is disposed at an inner side of the transparent window 2111, and a view finder of the image collector, namely the lens of the camera, is disposed corresponding to the transparent window, and the lens acquires the image to be translated through the transparent window, and the transparent window would not block the view of the viewfinder. It should be noted that that the window is disposed on the inclined surface and the viewfinder of the image collector is disposed corresponding to the window can ensure that the field of view of the image collector covers the pen tip and the word to be translated indicated by the pen tip, and further ensure that the word to be translated is accurately located.

In consideration of possible shaking of the housing and the pen head caused by splicing joint, in an optional embodiment, the first housing and the pen head are formed into an integral structure.

In the embodiment, an integrally-formed first housing and pen head structure effectively solves the shaking problem of splicing elements caused by splicing joint, which facilitates user operation and improves user experience.

In view of signal transmission between the pen core and the trigger switch, in an optional embodiment, as shown in FIGS. 2a-2c, the pen head 10 further includes a cylindrical linkage structure 60 connecting the pen head 111 and the trigger switch 40, and the linkage structure 60 transmits an external force received by the pen tip 111 for indicating a word to be translated to the trigger switch 40 in response to the external force.

In the embodiment, the external force received by the pen tip 111 is transmitted to the trigger switch 40 through the cylindrical linkage structure 60. According to the specific structure of the translator pen, especially considering the shapes of the pen tip and the trigger switch, the external force received by the pen tip can be steadily and effectively transmitted to the trigger switch by using the cylindrical linkage structure, so that erroneous operations of the translator pen caused by instable factors during the transmission process can be prevented from occurring to affect the user's reading experience.

In one specific example, the pen tip is a bullet-shaped pen tip made of a rigid material, the linkage structure is a cylindrical connecting rod made of rigid plastic, and the pen tip and the rigid connecting rod may be made of one-piece plastic or may be independently provided, and the trigger switch is a micro switch. In the case where the pen tip clicks or is pressed, two ends of the linkage structure are conducted in response to the external force transmitted by the linkage structure, which causes voltage change, thus a trigger signal is generated and then transmitted to the controller. The image collector is a black-and-white camera or a color camera with a horizontal view angle of 72 degrees and a vertical view angle of 48 degrees in a direction perpendicular to a book or a display device where the word to be translated is located. An optical axis of the image collector is parallel to a long axis of the housing passing through the pen tip, or forms a certain angle with the long axis, the angle being smaller than a preset degree, so as to ensure that the field of view of the image collector covers the pen tip. A distance from the lens of the image collector to the tip point of the pen tip is 3 cm, the lens has a fixed focal length, and the resolution of a captured image to be translated is 320*240 pixels. It should be noted that, a person skilled in the art may set the position, inclination angle, focal length and resolution of the image collector according to actual application requirements, as long as accurate collection of the word to be translated is achieved, which is not described herein.

In the embodiment, in consideration of the portability of the translator pen, the translator pen is powered by a lithium battery to provide a long time service, which is convenient for a user to use and carry.

In the embodiment, the translator pen can effectively identify the required word to be translated by collecting an image to be translated including the pen tip and the word to be translated, thereby solving the problems of the existing scanning type translator pen including excessive words fetching, erroneous word fetching and incomplete fetching of words in a large font size, and effectively improving the word fetching speed and the word fetching efficiency. It should be noted that the translator pen provided in the embodiment may also continuously collect and translate multiple words or a paragraph, which is not described herein again.

In view of processing of the image to be translated, in an optional embodiment, the translator pen further includes an image recognizer adapted to perform image processing and distortion correction according to the image to be translated to output the word to be translated to the controller.

Figure 4A:
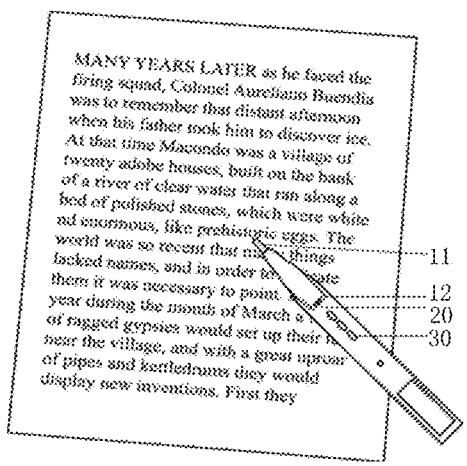
FIG. 4a is a schematic recognition diagram of an image recognizer according to an embodiment of the present disclosure.
Figure 4B:
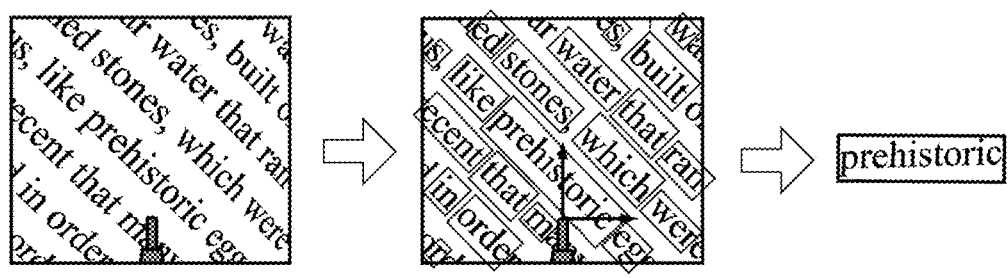
FIG. 4b is another schematic recognition diagram of the image recognizer according to an embodiment of the present disclosure.

In the embodiment, as shown in FIGS. 4a-4b, in order to obtain a high-performance image processing function, the image recognizer is separately provided in addition to a controller to implement the image processing function. The image recognizer may be a CPU, an SoC, an image processor, a neural network processor, or a similar chip, which is capable of performing accurate image processing on the collected image to be translated, including performing resolution adjustment on the image to be interpreted, such as reducing or increasing the resolution, or image cropping or image rotation, for example, to rotate the word to be translated to the horizontal direction, or to perform image distortion correction, perspective distortion, text detection, text recognition, and the like, all of which are existing image processing technologies, and outputting the recognized word to be translated of high-quality to the controller for translation.

In one specific example, as shown in FIG. 4a, the pen tip of the translator pen indicates a word "prehistoric", and as shown in FIG. 4b, an image to be translated including the pen tip collected by an image collector of the translator pen is subjected to image processing to identify the word. Specifically, the word in the image is in a rotation state. The image recognizer performs character recognition on the image to be translated, recognizes a plurality of words, determines a word to be translated according to the indication of the pen tip, performs image rotation so as to rotate the word to be horizontal, and finally outputs the recognized word to be translated and transmits the word to be translated to the controller.

In consideration of the specific output format of the translation result, in an optional embodiment, the translator pen further includes a display configured to display the translation result, for example, a display screen disposed on the housing, which may be a black-and-white display screen or a color display screen, for displaying the translation result.

In the embodiment, the translator pen further includes a key disposed on one side of the display. A user operates the key to implement operations such as page turning of content displayed on the display screen, system standby, volume adjustment, and the like, thereby effectively improving the user experience.

Meanwhile, the translator pen may further include a loudspeaker, such as a speaker, for playing the translation result, and the translation result is output in an audio format, so that a user can have a fast reading experience with an increased reading speed.

Figure 5A:
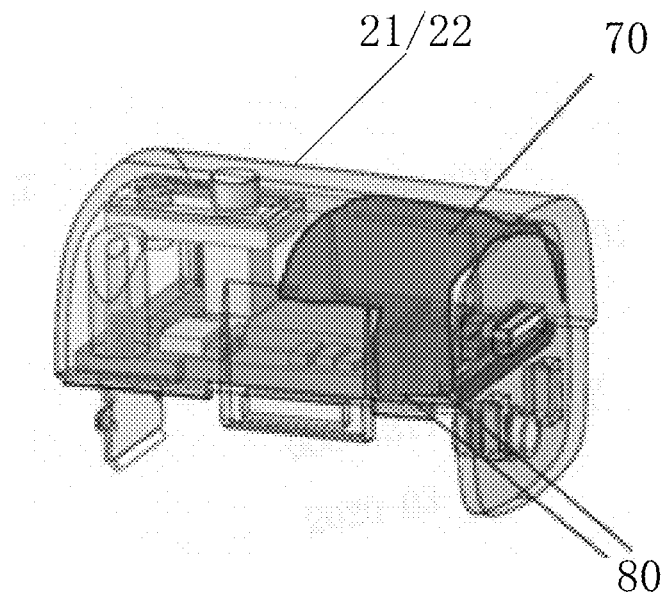
FIG. 5a is a partial perspective view of the translator pen according to another embodiment of the present disclosure.
Figure 5B:
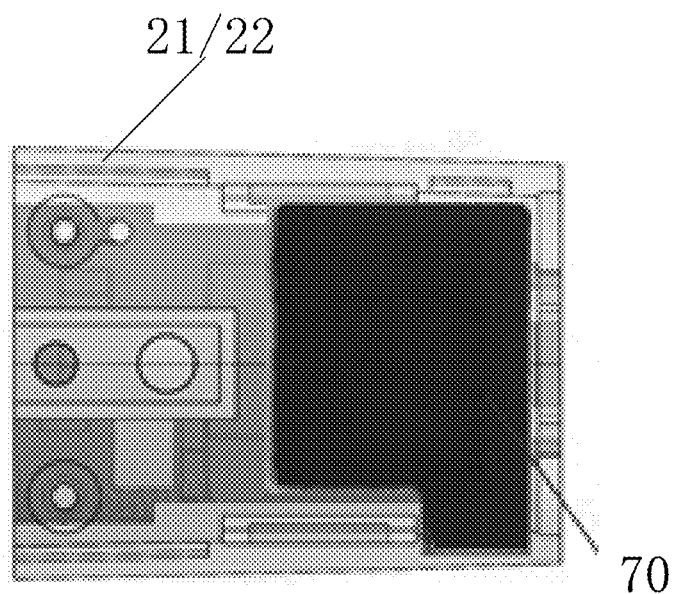
FIG. 5b is another view of the translator pen according to another embodiment of the present disclosure.
Figure 5C:
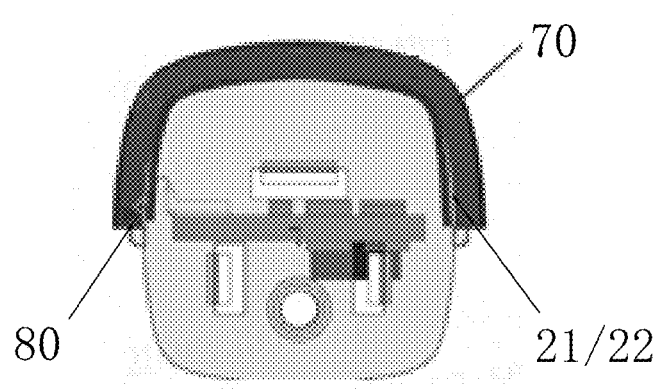
FIG. 5c is another view of the translator pen according to another embodiment of the present disclosure.

In view of specific output of the translation result, in an optional embodiment, as shown in FIGS. 5a to 5c, an end of the first accommodation cavity of the translator pen far from the pen head further includes an antenna 70 adapted to communicate with an external device, and the antenna is located at an inner side of the first housing or the second housing.

In the embodiment, in consideration of the problem that the antenna may have electromagnetic interference with electronic components or other metals inside the translator pen, the antenna is disposed at an end of the first accommodation cavity far from the pen head, that is, at the tail portion of the translator pen, so as to be as far from the electronic components and other metals as possible.

In the embodiment, the external device may be a mobile terminal, such as a smart phone or a tablet computer. The translator pen may send the collected image to be translated to the smart phone or the tablet computer through the antenna, and the image is processed by a processor in the smart phone or the tablet computer, so that the cost and weight of the translator pen are greatly reduced, and the user experience is improved. Meanwhile, the translator pen may also send the translation result to the smart phone or the tablet computer through the antenna, such that the translation result is displayed by the smart phone or the tablet computer, which can not only reduce the cost and weight of the translator pen, but also effectively protect user's eyesight and prevent a user from watching the translation result through a small narrow display screen disposed on the housing of the translator pen.

It should be noted that, a person skilled in the art may set different output formats according to actual application requirements. For example, in consideration of the universality of the translator pen, the devices mentioned above may be simultaneously disposed or alternatively one or two of the devices are disposed on the translator pen, which is not limited in the present disclosure.

In an optional embodiment, as shown in FIGS. 5a-5c, the antenna 70 is a flexible circuit board structure and is electrically connected to the controller through a pin 80.

In the embodiment, considering that the space in the first accommodation cavity of the translator pen is limited, and the antenna needs to be far from interference of electronic components and other metals, the antenna adopts a Flexible Printed Circuit (FPC) structure, which is more appropriate for a limited space in the translator pen, and is convenient to be disposed and mounted. The antenna is electrically connected to the circuit board through electronic components disposed in the first accommodation cavity or a pin disposed on the circuit board.

In an optional embodiment, the antenna is attached to an inner wall of the first housing or the second housing.

In the embodiment, in order to further improve the antenna performance and avoid electromagnetic interference inside the translator pen, an antenna in a flexible circuit board (FPC) structure is attached to an inner side of the first housing or second housing, i.e., the antenna is attached along the inner wall of the first or second housing, so that the working area of the antenna is increased and the antenna performance is effectively increased.

Another embodiment of the present disclosure provides a translator pen including a housing and an antenna on the housing adapted to communicate with an external device, the antenna being attached to an inner wall of the housing.

In the embodiment, similar to the above embodiment, the translator pen communicates with an external device through the antenna. In consideration of a limited space inside the translator pen and electronic components, circuit board and other metals in the translator pen that have electromagnetic interference with the antenna, the antenna is disposed at the tail portion of the translator pen and adopts a Flexible Printed Circuit (FPC) structure to be attached to the inner wall of the housing of the translator pen, and is electrically connected to the circuit board through electronic components disposed in the first accommodation cavity or a pin disposed on the circuit board.

In an optional embodiment, the translator pen further includes a display, which is disposed on the accommodation cavity and located at a side of the image collector away from the pen head, for displaying the translation result.

In the embodiment, the translator pen displays the translation result through a display disposed on the accommodation cavity, which facilitates the user to obtain the translation result, and the display is a black and white liquid crystal display or a color liquid crystal display with a capacitive touch function.

In another optional embodiment, the translator pen further includes a speaker disposed in the accommodation cavity for playing the translation result.

In the embodiment, the translator pen plays the translation result through a speaker disposed in the accommodation cavity, which facilitates the user to obtain the translation result.

It should be noted that, the output format of the translation result is not limited in the present application, and one or a plurality of output formats should be selected by a person skilled in the art according to actual application requirements, so as to facilitate the user to obtain the translation result.

An embodiment of the present disclosure further provides a translation method using a translator pen. The translator pen includes a housing and a pen head at an end of the housing, the housing forms a first accommodation cavity adapted to accommodate an image collector; an outer contour of the pen head is formed into a tapered shape, an outer diameter of the pen head gradually decreases along a direction of the pen head away from the housing and forms a second accommodation cavity adapted to accommodate a pen core; the pen head is formed at a portion of the end of the housing, and at least a portion of the end of the housing, which does not form the pen head, forms an inclined surface, the inclined surface being inclined relative to the outer contour of the pen head toward an outside of the housing along a direction of the housing away from the pen head, the image collector is disposed on the inclined surface, the first accommodation cavity further includes a trigger switch and a controller, and the pen core includes a pen tip far from one end of the housing.

Figure 6:
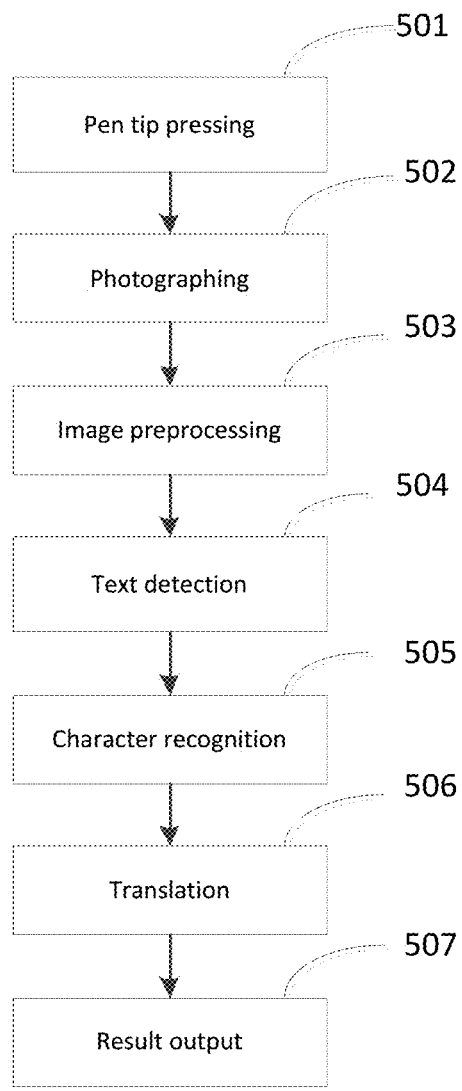
FIG. 6 is a flowchart of a translation method using a translator pen according to an embodiment of the present disclosure.

As shown in FIG. 6, the method includes: a pen tip pressing step of pressing the pen tip close to a word to be translated, and transmitting a received external force to the trigger switch, which sends a trigger signal; a photographing step of controlling, by the controller, the image collector to collect an image to be translated including the pen tip and a word to be translated indicated by the pen tip in response to the trigger signal; an image preprocessing step of preprocessing a collected image to be translated to obtain a processed image; a text detection step of marking an image area with words on the processed image to select a target image area where the word to be translated is located; a character recognition step of performing character recognition on the target image area to obtain a word character to be translated; a translation step of translating the word character to obtain a translation result; and a result output step of outputting the translation result.

Optionally, the image preprocessing may at least include one or a plurality of the following steps: resolution adjustment, image cropping, image rotation, and image distortion correction.

More specifically, in the pen tip pressing step 501, a user holds the pen body by hand in a normal pen-holding gesture with the image collector 30 above and the pen tip 111 below, the pen tip 111 is pressed (clicked) close to the word to be translated, and the trigger switch 40 is triggered to send a trigger signal. In this step, according to different writing and printing habits, the pen tip 111 may click in different directions of the word to be translated. Specifically, the pen tip clicks a position below a horizontal line or a position in a right lower side of the horizontal line, or a position in a right side/right lower side/left side/left lower side of a vertical line, or a position below the vertical line. In short, the click position should be closest to the word to be translated, without obstructing the image collector 30 from collecting an image of the word to be translated.

In the photographing step 502, the controller 50 controls the image collector 30 to collect an image to be translated including the pen tip 111 and a word to be translated indicated by the pen tip in response to the trigger signal.

In the image preprocessing step 503, the image to be translated obtained in the photographing step is subjected to image preprocessing to obtain a processed image. This step may be performed by the controller 50 or by an arithmetic processor, or may be performed by an image processor in the image collector 30.

In the text detection step 504, the step is generally performed by an arithmetic processor, and a target image area where the word to be translated is located is selected according to the nearest distance principle.

In the character recognition step 505, the step is generally performed by an arithmetic processor.

In the translation step 506, the step is generally performed by an arithmetic processor.

In the result output step 507, the translation result obtained is output to a user in a sensible format, including but not limited to: text or image displayed by a display (display screen) or in an audio format output by a loudspeaker.

In the embodiment, the translation of the translator pen is completed by methods of pen tip pressing, photographing, image preprocessing, text detection, character recognition, translation and result output, so that the problem of erroneous word fetching of the conventional translator pen can be solved, and the word fetching speed and the word fetching efficiency can be effectively improved.

To solve the existing problems, the present disclosure provides a translator pen and a translation method using the translator pen. By means of a pen head disposed at one end of the housing, an image to be translated including a pen tip and a word to be translated indicated by the pen tip is captured by clicking or pressing in cooperation with an image collector, and image recognition and translation are performed according to the image to be translated to output a translation result, so that the problem of erroneous word fetching of the existing translator pen caused by the position of the image collector is solved, and the word fetching speed and the word fetching efficiency are effectively improved, thus the translator pen has a wide application prospect.

It should be understood that the embodiments of the present disclosure described above are merely examples for clearly illustrating the present disclosure and are not intended to limit the embodiments of the present disclosure, and that various other modifications or changes may be made on the basis of the above-described embodiments by those skilled in the art. The present disclosure is not intended to be exhaustive. All other modifications or changes that can be derived from the technical schemes of the present disclosure shall fall within the protection scope of the present disclosure.

What is claimed is:

1. A translator pen comprising a housing and a pen head at an end of the housing, wherein,
the housing forms a first accommodation cavity adapted to accommodate an image collector;
an outer contour of the pen head is formed into a tapered shape, an outer diameter of the pen head gradually decreases along a direction of the pen head away from the housing and forms a second accommodation cavity adapted to accommodate a pen core;
the pen head is formed at a portion of the end of the housing, and at least a portion of the end of the housing, which does not form the pen head, forms an inclined surface, the inclined surface being inclined relative to the outer contour of the pen head toward an outside of the housing along a direction of the housing away from the pen head, and the image collector is disposed on the inclined surface,
wherein the housing comprises a first housing and a second housing formed by snap-fit, and the first housing and the pen head are formed into an integral structure.

2. The translator pen of claim 1, wherein the inclined surface is formed at an entire end of the housing, and the inclined surface is of an oval shape.

3. The translator pen of claim 1, wherein the first accommodation cavity further comprises a trigger switch and a controller, the pen core comprises a pen tip away from one end of the housing, the pen tip is configured to indicate a word to be translated and transmit a received external force to the trigger switch to trigger the image collector to collect an image to be translated comprising the pen tip and the word to be translated indicated by the pen tip, so that the controller translates the word to be translated according to the image to be translated and outputs a translation result.

4. The translator pen of claim 3, wherein a window is disposed on the inclined surface, the window corresponds to a viewfinder of the image collector disposed in the housing, and the image collector collects, by the viewfinder, the image to be translated comprising the pen tip and the word to be translated indicated by the pen tip through the window.

5. The translator pen of claim 3, further comprising a cylindrical linkage structure connecting the pen core and the trigger switch, and the linkage structure transmits the external force received by the pen tip indicating the word to be translated to the trigger switch.

6. The translator pen of claim 1, wherein the image collector comprises a camera,
an optical axis of the camera is parallel to an axial direction of a long axis of the pen core; or
the optical axis of the camera and the axial direction of the long axis of the pen core form an angle smaller than a preset degree.

7. The translator pen of claim 1, wherein an end of the first accommodation cavity far from the pen head further comprises an antenna adapted to communicate with an external device, and the antenna is at an inner side of the housing.

8. The translator pen of claim 7, wherein the antenna is a flexible circuit board structure electrically connected to the controller through a pin.

9. The translator pen of claim 1, wherein an end of the first accommodation cavity far from the pen head further comprises an antenna adapted to communicate with an external device, and the antenna is attached to an inner wall of the housing.

10. A translation method using a translator pen,
wherein the translator pen comprises a housing and a pen head at an end of the housing, wherein the housing forms a first accommodation cavity adapted to accommodate an image collector; an outer contour of the pen head is formed into a tapered shape, an outer diameter of the pen head gradually decreases along a direction of the pen head away from the housing and forms a second accommodation cavity adapted to accommodate a pen core; the pen head is formed at a portion of the end of the housing, and at least a portion of the end of the housing, which does not form the pen head, forms an inclined surface, the inclined surface being inclined relative to the outer contour of the pen head toward an outside of the housing along a direction of the housing away from the pen head, the image collector is disposed on the inclined surface, the first accommodation cavity further comprises a trigger switch and a controller, and the pen core comprises a pen tip far from one end of the housing,
wherein the method comprises:
a pen tip pressing step of pressing the pen tip close to a word to be translated, and transmitting a received external force to the trigger switch, which sends a trigger signal;
a photographing step of controlling, by the controller, the image collector to collect an image to be translated comprising the pen tip and the word to be translated indicated by the pen tip in response to the trigger signal;
an image preprocessing step of preprocessing a collected image to be translated to obtain a processed image;
a text detection step of marking an image area with words on the processed image to select a target image area where the word to be translated is located;
a character recognition step of performing character recognition on the target image area to obtain the word to be translated;
a translation step of translating the word character to obtain a translation result; and
a result output step of outputting the translation result.

11. The translation method using the translator pen of claim 10, wherein
the image preprocessing step at least comprises one or a plurality of the following steps: resolution adjustment, image cropping, image rotation, and image distortion correction.

* * * * *